United States Patent [19]

Megy

[11] Patent Number: 4,668,286
[45] Date of Patent: May 26, 1987

[54] PROCESS FOR MAKING ZERO VALENT TITANIUM FROM AN ALKALI METAL FLUOTITANATE

[75] Inventor: Joseph A. Megy, Corvallis, Oreg.

[73] Assignee: Occidental Research Corporation, Los Angeles, Calif.

[21] Appl. No.: 745,591

[22] Filed: Jun. 17, 1985

Related U.S. Application Data

[63] Continuation-in-part of Ser. No. 378,292, May 14, 1982, abandoned.

[51] Int. Cl.$^4$ .................. C22B 34/00; C22B 34/12
[52] U.S. Cl. .................................. 75/84; 75/84.4
[58] Field of Search ............... 75/84, 84.4, 84.5; 423/82-86, 492, 598, 610, 611

[56] References Cited

U.S. PATENT DOCUMENTS

| | | | |
|---|---|---|---|
| 3,000,726 | 9/1961 | Spedding et al. | 75/84.4 X |
| 4,127,409 | 11/1978 | Megy | 75/84.4 |
| 4,359,449 | 11/1982 | Hard et al. | 423/8 |

FOREIGN PATENT DOCUMENTS 161021 10/1952 Australia .................. 75/84.4

Primary Examiner—Richard D. Lovering
Assistant Examiner—Matthew A. Thexton
Attorney, Agent, or Firm—Christie, Parker & Hale

[57] ABSTRACT

The instant invention relates to a continuous, countercurrent process for reducing an alakli metal fluotitanate salt, e.g. $Na_2TiF_6$, comprising +4 valent titanium, to zero valent titanium, in a two-step reduction process, wherein said reduction process is carried out in an adiabatic mode, and which comprises:

(a) contacting said alkali metal fluotitanate, as a crystalline salt, with a first molten alloy at a reaction temperature, comprising titanium, aluminum and zinc, to reduce a portion of said +4 valent titanium to +3 valent titanium and at least 60% of the remainder to zero valent titanium and thereby melting and heating said crystalline salt to said reaction temperature, and to form a first molten salt phase comprising +3 valent titanium and an alkali metal aluminum fluoride salts, and a second molten alloy phase comprising titanium and zinc, said second molten alloy phase being immiscible with said first molten salt phase;

(b) separating said first molten salt phase from said second molten alloy phase;

(c) reducing said +3 valent titanium from said first molten salt phase by contacting said first molten salt phase at said reaction temperature with a third molten alloy phase at a temperature below said reaction temperature, comprising aluminum and zinc, to reduce said +3 valent titanium to zero valent titanium and thereby heating said third molten alloy phase to said reaction temperature, and to form said first molten alloy phase and a second molten salt phase, said first molten alloy phase being immiscible with said second molten salt phase;

(d) separating said second molten salt phase from said first molten alloy phase; and (e) recycling said first molten alloy phase to step (a).

36 Claims, 2 Drawing Figures

PROCESS FOR MAKING ZERO VALENT TITANIUM FROM AN ALKALI METAL FLUOTITANATE

This is a continuation-in-part application of U.S. patent application Ser. No. 378,292, filed May 14, 1982, now abandoned.

FIELD OF THE INVENTION

The instant invention relates to a process for the reduction of an alkali metal fluotitanate salt to zero valent titanium and oxidation of aluminum to aluminum fluoride salts. Such reduction is carried out by contacting the alkali metal fluotitanate salt with a molten alloy of zinc and aluminum at conditions whereby titanium is converted into a titanium-zinc alloy and the aluminum is converted into fluoride salts. The zero valent titanium may be recovered as a titanium metal by subliming off the zinc. The alkali metal fluotitanate salt may be prepared from an ilmenite ore, e.g. by fluorinating said ilmenite ore with an alkali metal fluosilicate salt such as sodium fluosilicate.

CROSS REFERENCE TO RELATED PATENT APPLICATIONS

This patent application is related to U.S. patent application Ser. No. 216,057, filed on Dec. 15, 1980, now abandoned, and U.S. Pat. Nos. 4,390,365 and 4,468,248, both of which are entitled "Process for Making Titanim Metal from Titanium Ore", respectfully, in the name of the instant inventor. This application is also related to U.S. Pat. No. 4,390,365 entitled "Process for Making Titanium Metal from Titanium Ore" and U.S. Pat. No. 4,359,449 entitled "Process for Making Titanium Oxide rrom Titanium Ore" which were issued in the names of Robert A. Hard and Martin A. Prieto. The above abandoned patent application and patents are hereby incorporated by reference. The above patent applications are hereby incorporated by reference to further describe and illustrate the various steps of the process of the instant invention.

BACKGROUND OF THE PRIOR ART

Titanium metal has been essential to the aerospace industry since the early fifties because it combines a high strength to weight ratio with the ability to perform at much higher temperatures than aluminum or magnesium. It also has growing usage in the chemical processing industries because of its excellent resistance to corrosion such as, chloride corrosion.

Much of the United States primary titanium is imported from Japan and Europe. A majority of titanium is made by the "Kroll Process" which involves magnesium reduction of titanium tetrachloride, which is in turn made from rutile ($TiO_2$). Titanium metal is also made by sodium reduction and electrowinning. The product of the "Kroll Process" is a metallic sponge which is later consolidated by a high temperature arc melting process. The most important consideration for any process making titanium is to prevent contamination with either metallic or non-metallic impurities, because even small amounts of oxygen or nitrogen can make the product brittle and unworkable, although carefully controlled amounts of oxygen, nitrogen, and carbon may be added to strengthen titanium alloys.

Titanium may be produced by reducing volatile titanium halides such as the chloride, bromide or iodide with an aluminum-zinc alloy. (See U.S. Pat. No. 2,753,256 to Olson). The Olson patent describes a vapor-liquid reaction wherein the titanium compound that is being reduced is introduced to the process as a vapor. Therefore, relatively non-volatile titanium compounds, e.g. titanium fluoride, alkali metal fluotitanates, etc. are not mentioned as suitable for reduction to titanium.

Others have reduced such relatively non-volatile titanium salts to zero valent titanium by means of molten aluminum. For example, see U.S. Pat. Nos. 2,550,447; 2,781,261; 2,931,722 and 2,837,426. Other reductants used to reduce such relatively non-volatile salts to zero valent titanium include alkali metals, (e.g. sodium), as described in U.S. Pat. Nos. 2,857,264 and 3,012,878; alkaline earth metals, as described in U.S. Pat. No. 3,825,415. None of these references teach the use of an aluminum-zinc alloy for reducing such relatively non-volatile salts, nor the multi-step reduction process described below.

Other art of interest may be found in U.S. Pat. Nos. 4,127,409 and 4,072,506 which are related to the recovery of zirconium and hafnium, respectively, by the reduction of the corresponding potassium chlorozirconates or hafniates by means of an alloy of aluminum and zinc.

In neither patent is the adiabatic reduction process of the instant invention suggested. More specifically, molten potassium chlorozirconates or chlorohafniates are mixed with the molten aluminum-zinc alloy and the resulting admixture heated to a reduction temperature of about 900° C. It is obvious that the external heat input to the processes described in the aforesaid patents is necessarily great.

SUMMARY OF THE INVENTION

The instant invention relates to a countercurrent process for reducing an alkali metal fluotitanate salt, e.g. $Na_2TiF_6$, comprising +4 valent titanium, to zero valent titanium, in a two-step reduction process, wherein said reduction process is carried out in an adiabatic mode, and which comprises:

(a) contacting said alkali metal fluotitanate, as a crystalline salt, with a first molten alloy phase, comprising titanium, aluminum and zinc, to melt said salt and reduce a portion of said +4 valent titanium to +3 valent titanium and the remainder to zero valent titanium and thereby heat said crystalline salt to form a first molten salt phase comprising +3 valent titanium fluoride salt and an alkali metal aluminum fluoride salts (i.e., a mixture of an alkali metal fluoride, alkali metal aluminum fluoride and aluminum fluoride), and a second molten alloy phase, said second molten alloy phase being immiscible with said first molten salt phase;

(b) separating said first molten salt phase from said second molten alloy phase; and (c) separating said +3 valent titanium from said first molten salt phase by contacting said first molten salt phase with a third molten alloy phase comprising aluminum and zinc, to reduce said +3 valent titanium to zero valent titanium and form a fourth molten alloy phase and a second molten salt phase, said fourth molten alloy phase being immiscible with said second molten salt phase and comprising zinc and said zero valent titanium.

Preferably the above process is carried out in a countercurrent, two-stage, reduction process wherein said first molten alloy phase originates in the second stage (as said fourth molten alloy) and is passed to the first stage and utilized as said first molten alloy phase. That is, the instant invention preferably comprises a process for reducing an alkali metal fluotitanate, e.g. $Na_2TiF_6$, comprising +4 valent titanium, to zero valent titanium, in a two-stage, countercurrent reduction process, which process is carried out in an adiabatic mode and comprises the steps of:

(a) introducing a crystalline, alkali metal fluotitanate salt comprising +4 valent titanium, into the first stage of a countercurrent contacting zone and therein contacting said crystalline salt with a molten alloy phase comprising titanium, zinc and aluminum, to reduce said +4 valent titanium and oxidize said aluminum to aluminum fluoride salts, the reduction of said +4 valent titanium to +3 valent titanium and zero valent titanium being sufficient to oxidize substantially all of said aluminum in said molten alloy phase to aluminum fluoride salts and provide sufficient heat to melt said crystalline alkali metal fluotitanate salt and thereby provide (i) a molten salt phase comprising a mixture of an alkali metal fluoride, aluminum fluoride salts, and titanium as a +3 valent salt, and (ii) a molten alloy phase comprising titanium and zinc and substantially depleted in aluminum;

(b) introducing a molten alloy comprising aluminum and zinc as feed into a second stage of said countercurrent contacting zone and therein contacting said molten alloy with the molten salt phase from the first stage to reduce substantially all of said +3 valent titanium salt to zero valent titanium and provide (i) a molten salt phase comprising a mixture of an alkali metal fluoride, and aluminum fluoride salts, which molten salt phase is substantially depleted in titanium, and (ii) a molten alloy phase comprising aluminum, titanium and zinc;

(c) passing said molten alloy phase comprising aluminum, titanium and zinc from said second stage to said first stage;

(d) withdrawing said molten salt phase substantially depleted in titanium from said second stage; and (e) withdrawing said molten alloy phase substantially depleted in aluminum from said first stage.

The process of the instant invention can be operated as a continuous, semi-continuous, or batch process. In the continuous mode, the products of each stage flow to the next stage at completion of the reactions for further reduction or oxidation, as the case may be, as described herein. The titanium in the alkali metal fluotitanate salt is reduced to zero valent titanium, i.e., titanium metal and the aluminum in the zinc-aluminum alloy is oxidized to aluminum fluoride salts. The alkali metal fluotitanate salt stream and the zinc-aluminum alloy stream flow in opposing directions within the process, i.e., countercurrently.

Unexpectedly, it has been discovered that the reduction of the alkali metal fluotitanate salt is quite exothermic and produces enough heat to drive the process without external heating. Although the heat of reaction for the reduction of an alkali metal fluotitanate with aluminum apparently has not been reported, I have determined by experimentation that the exothermic heat of reaction of the reduction of sodium fluotitanate to zero valent titanium with aluminum in a zinc solvent system is about −2222 cal/g of +4 valent titanium reduced to zero valent titanium. In this adiabatic process, the only additional heat required is the heat needed to melt the zinc-aluminum alloy. Thus, the present process affords a means of reducing an alkali metal fluotitanate salt nearly quantitatively with a minimum of externally supplied energy.

The present process can produce up to about 25% excess heat energy over that required to carry out the process. Depending upon the weight ratio of titanium to zinc in the alloy used in the process, the surplus heat could be used for other purposes such as heating and melting of the aluminum-zinc-alloy. However, not all of the surplus heat energy is recoverable and a portion of such heat energy will be lost through convection, conduction and infra-red emissions.

DESCRIPTION OF THE INVENTION

The instant invention may be understood by reference to the preferred embodiment described in the following FIG. 1 and accompanying description. For the purpose of this description the numerals 1 through 12 refer to the various process streams and letters A through D refer to the various stages, zones (or reactors) of the preferred embodiment of the instant invention. It should be noted that the reactions described below are carried out in a graphite vessel or other suitable material and under an inert atmosphere, e.g. argon, etc. The molten alloy stream may be introduced into the process at any temperatures below the boiling point of the molten alloy, e.g. from about 400° to about 900° C., e.g. about 450° C. The reactants in each stage are vigorously stirred to insure completion of the reactions.

A molten aluminum-zinc alloy 1 at about 450° C. is passed into the stage C of a countercurrent contacting zone (said countercurrent contacting zone being represented by first stage B and said second stage C) and contacted therein with a molten salt phase 10 from first stage B at a temperature of about 900° C. Such molten salt phase is the reaction product originating in said first stage B and comprises a mixture of an alkali metal fluoride, aluminum fluoride salts and titanium as a +3 valent salt. Such contacting is effected by mixing the immiscible molten salt and molten alloy phases to disperse one phase as droplets within the other. Sufficient agitation is provided to form droplets of sufficiently low or small diameter to maximize contact of such two immiscible phases at the interface of the droplets and the continuous phase and such agitation is continued until reaction is complete. The reaction, is rapid and therefore, residence time may be as low as 5 to 10 minutes in each stage in the semi-continuous mode and 20 to 30 minutes in each stage for the continuous mode.

By continuous process is meant a process wherein reactants and products are continuously introduced and removed, respectively, from the reactors. The reactants will remain in the reactors for a predetermined residence time dependent upon the volume of the reactor, and the flow rates of the materials being introduced and removed from the reactor. By semi-continuous process is meant a process wherein reactants are added to a reactor and the resulting reaction between the reactants is permitted to approach, or go to, equilibrium. The resulting products if intermediates, are passed to the next stage upon completion of the reaction; thus, each stage is in continuous use although there is not a continuous flow of material between stages. Although the reactants in each stage are agitated or stirred to disperse droplets of molten salt into the molten alloy, separation of the molten salt and alloy in a continuous operation is easily obtained. The salt and alloy are substantially immiscible in each other and readily separate because of their differences in surface tension and density (the salt has a specific gravity of about 3 and the alloy a specific gravity of about 7). During operation of the continuous process, alloy free salt is withdrawn from the top of the reactants and salt free alloy is withdrawn from the bottom of the reactants. The intimate mixing of salt and alloy is confined to the middle portion of the reactants with the salt, primarily, being dispersed into the alloy.

The +3 valent titanium salt reacts with the aluminum and is substantially converted to zero valent titanium. The aluminum reactant reports to the salt phase as aluminum fluoride salts and the zero valent titanium reports to the alloy phase. An excess of aluminum as aluminum-zinc alloy is provided in said second stage C to ensure substantially complete conversion of +3 valent titanium to zero valent titanium. The heat of reaction in said second stage C is sufficient to heat the molten aluminum-zinc alloy 1 to about 900° C. A molten salt phase 11 comprising a mixture of an alkali metal fluoride and aluminum fluoride salts, separates from a molten alloy phase 4 comprising aluminum, titanium and zinc. Such separation is quite easily effected by suitable design of the reactor due to the surface tension and density properties of the molten alloy phase 4 and the molten salt phase 11.

Said molten alloy phase 4 is passed to said first stage B of said countercurrent contacting zone at a temperature of about 900° C. and therein contacted with a crystalline, alkali metal fluotitanate salt 7, e.g. $Na_2TiF_6$, comprising +4 valent titanium. Such contacting is carried out in a manner similar to the contacting process of the second stage C described above. The +4 valent titanium is reduced to +3 valent titanium and zero valent titanium by the aluminum in said molten alloy phase 4. Substantially all of the aluminum in said molten alloy phase 4 is oxidized to aluminum fluoride salts. The combination of the heat of said molten alloy phase 4 and the exothermic heat generated by reducing the +4 valent titanium to +3 valent titanium and zero valent titanium and oxidizing the aluminum is sufficient to melt said crystalline alkali metal fluotitanate salt 7 and raise the temperature thereof to about 900° C.

During the reduction which takes place in said first stage B, the aluminum present in molten alloy phase 4 is substantially converted to aluminum fluoride salts. A molten alloy phase 5 substantially depleted in aluminum is separated from said molten salt phase 10. The molten salt phase 10, including aluminum fluoride salt, alkali metal fluoride and titanium as a +3 valent titanium salt, is passed to the second stage C and utilized as described above.

Again, separation of the molten salt phase 10 and the molten alloy phase 5 is easily affected due to surface tension and density properties.

It should be noted that other than the heat necessary to melt the aluminum-zinc alloy provided as stream 1 no heat is necessary for the above countercurrent, two-step reduction process. Thus the instant process may be termed an adiabatic, countercurrent, reduction process. The economic benefit of this feature will be apparent to those skilled in the art. Moreover, the use of the above countercurrent reduction process provides a very pure molten alloy 5 and molten salt 11. For example, in a 2-stage continuous operation the aluminum content of said molten alloy 5 may be less than 0.2% and the titanium content of said molten salt 11 may be less than 0.5%, and in a 4-stage continuous operation or 2-stage semi-continuous operation the aluminum content of said molten alloy 6 or 5, reprectively, may be less than 2 parts per million, by weight, and the titanium content of said molten salt 12 or 11, respectively, may be less than 100 parts per million, by weight. In addition to the obvious desire to recover substantially all of the titanium from the alkali metal fluotitanate, the purity of said molten salt 11 is especially important if said salt is to be used for aluminum reduction cell feed; a well known use of the "psuedo cryolite" salt obtained from the instant process. Contamination of the titanium-zinc alloy 5 with aluminum may result in an inferior grade of titanium metal when the titanium-zinc alloy is used to prepare titanium metal as described below.

Notwithstanding the above advantages, if further purification of molten alloy phase 5 and molten salt phase 11 is desirable, further treatment in a metal cleanup reactor A and salt cleanup reactor D may be carried out.

Typically, molten alloy phase 5 comprising less than about 0.2% by weight aluminum may be contacted in metal cleanup reactor A with a crystalline, alkali metal fluotitanate salt 8 to further deplete aluminum from the molten alloy phase 5 and provide a molten salt phase 9 wherein the +4 valent titanium is converted to +3 valent titanium. The molten alloy phase 6 comprising less than about 0.005%, by weight, aluminum (less 50 parts per million, by weight) is separated from said molten salt phase 9 and said molten salt phase 9 may be passed to first stage B. The contacting and separation is similar to that carried out in said first stage B except that the relative amounts of the molten salt phase 9 and the molten alloy phase 6 differ substantially from molten salt phase 10 and molten alloy phase 5. For example, from about 2 to about 5%, by weight, of the crystalline alkali metal fluotitanate, ultimately reduced to zero valent titanium, may originate in the metal cleanup reactor A.

Molten salt phase 11, which typically comprises less than 0.5% titanium as +3 valent salt, may be passed to salt cleanup reactor D) and treated with a molten alloy phase 2, comprising an aluminum-zinc alloy at a temperature of about 450° C. to reduce the titanium content of molten salt phase 11 to less than about 0.01% (less than 100 parts per million, by weight). The molten salt is ultimately recovered as a very pure pseudocryolite 12 which is a mixture of $Na_5Al_3F_{14}$ and $NaAlF_4$ salts. As shown, an aluminum-zinc alloy phase 3 including small amounts of zero valent titanium from said treatment in salt cleanup reactor D may be passed to the second stage C of the reduction zone. From about 5% to about 15%, by weight, of the aluminum-zinc alloy ultimately consumed in the reduction of the titanium salt to zero valent titanium may originate in said salt cleanup reactor D.

The process temperature in each of stages A through D may be from about 650° C. to about 1000° C.; preferably from about 850° C. to about 950° C. At temperatures above about 925° C., the zinc in the alloy will boil at atmospheric pressure. Accordingly, at process temperatures above about 925° C., the process is preferably conducted at above atmospheric pressures to minimize zinc losses. The molten aluminum-zinc alloy introduced in stages C and D may have a temperature from the melting point temperature of the alloy to the boiling point temperature of the alloy; preferably the alloy temperature is from about 425° C. to about 450° C. for adiabatic operation. The alloy can be heated to a higher temperature, such as 900° C., but this will require additional external energy. The crystalline alkali metal fluotitanate is introduced into the process at ambient temperatures, i.e., 25° C. The crystalline fluotitanate can be introduced into the process at a temperature between 0° C., or lower, and the melting point temperature of the fluotitanate. Conveniently the fluotitanate is introduced at ambient temperature for adiabatic operation.

The proportions of aluminum in the aluminum-zinc alloy and the alkali metal fluotitanate salt in stages B and C are adjusted so that virtually all the +4 titanium salt in stage B will be reduced to +3 titanium salt and a portion of the +3 titanium salt to zero valent titanium and substantially all the remaining portion of +3 valent titanium salt (99% or more) in stage C will be reduced to zero valent titanium.

When the process is conducted at atmospheric pressure, the aluminum-zinc alloy conveniently contains between about 5% and about 17%, by weight, aluminum, preferably between about 10% and about 12%, by weight, aluminum. When the process is conducted at pressures above atmospheric, the alloy will preferably contain about 16 to about 18%, by weight, aluminum. Aluminum-zinc alloys containing high loadings of aluminum will limit the amount of titanium metal recovery since titanium metal is less soluble in zinc than aluminum at the process temperatures of the present invention—at 900° C. and at atmospheric pressure, about 14%, by weight, of titanium will dissolve in zinc. At elevated pressures, e.g. 2 to 3 atmospheres, about 22% to about 24%, by weight, of titanium is soluble in zinc. Aluminum-zinc alloys containing low aluminum loadings are not preferred because the use of such alloys requires a higher mass of alloy to be introduced into the process to reduce all the alkali metal fluotitanate to zero valent titanium.

To operate the process in an adiabatic mode, and obtain near quantitative yields of zero valent titanium and aluminum fluoride salts, the reduction of the alkali metal fluotitanate must proceed in the step wise manner with partial reductions as described herein.

Unexpectedly, the reduction of alkali metal fluotitanate to zero valent titanium, i.e., titanium metal, occurs in a stepwise manner in the present process. The salt is first reduced to a +3 valent titanium salt. The +3 valent titanium salt is then reduced to zero valent titanium, possibly through an unstable +2 valent titanium salt intermediate. Zinc can reduce an alkali metal fluotitanate to a +3 valent titanium salt with the concomitant production of a zinc fluoride salt or salt mixture and heat of reaction. Surprisingly, although zinc salts are not recovered in the aluminum fluoride salt product stream, it appears that zinc in the molten aluminum-zinc alloy participate in the reduction of the +4 valent titanium, i.e., the alkali metal fluotitanate. However, it does not appear that zinc can reduce the +3 valent titanium to zero valent titanium.

Apparently the aluminum present in the molten aluminum-zinc alloy reduces the zinc fluoride salts to zinc metal. As a consequence, very little zinc is found in the product aluminum fluoride salt phases of the present process.

The aluminum preferentially reduces the +4 valent titanium to +3 valent titanium before reducing the +3 valent titanium to zero valent titanium. Thus, in the present process, in the first stage B all the alkali metal fluotitanate is reduced to +3 valent titanium and a portion of the +3 valent titanium is reduced to zero valent titanium in the presence of less than a stiochiometric amount of aluminum to oxidize substantially all the aluminum. In the second stage C, the remaining +3 valent titanium is reduced in the presence of a greater than stiochiometric amount of aluminum to reduce substantially all of the +3, valent titanium to zero valent titanium. It is also noteworthy that the aluminum in the first stage B is oxidized to aluminum fluoride salts in the presence of a greater than stoichiometric amount of alkali metal fluotitanate.

The process is readily controlled by monitoring the temperature of each stage. The temperature of each stage should be between about 650° C. and about 1000° C., preferably between about 850° C. and about 950° C. If the temperature of a given stage falls below the desired temperature, additional salt and/or alloy is added to the stage as described herein to maintain the desired temperature. If the temperature of a given stage rises above the desired temperature, agitation and/or addition of reactants may be diminished or stopped to slow down the reactions and production of exothermic heat of reaction.

One of the advantages of the present process is that the process can be controlled by temperature monitoring without the need to resort to chemical analysis of the products. When an alkali metal fluotitanate is reduced to zero valent titanium in accordance with the present process, the titanium-zinc alloy product will be substantially free of impurities, such as aluminum, alkali metal fluorine and salts thereof. There is no need to perform on-line chemical analysis to control the process. The process will almost quantitatively reduce the fluotitanate salt to zero valent titanium (yields of 99% or more).

For each mole of zero valent titanium produced, 1.333 moles of aluminum are consumed, i.e., oxidized to aluminum fluoride salts. Thus, for each mole of titanium as a +4 valent titanium salt introduced into the process, 1.333 moles of aluminum as the molten aluminum-zinc alloy are introduced into the process as described herein.

For the abiabatic mode, about 20% to about 47%, by weight, of the +4, valent titanium salt is reduced completely to zero valent titanium and the balance of the +4 valent titanium salt is reduced to +3 valent titanium salt. Preferably, about 27% to about 40% by weight of the reduction to zero valent titanium takes place in the first stage. As described above, the reduction proceeds in at least two steps, first reduction of +4 valent titanium salt to +3 valent titanium salt and then the reduction of the +3 salt to zero valent titanium. Thus, about 53% to about 80%, by weight, of the +3 valent titanium salt produced in the first stage B is transferred to the second stage C wherein it is reduced to zero valent titanium, the balance of the +3 salt being reduced in the first stage B.

About 66% to about 76% of the exothermic heat of reaction is produced in the first stage B, preferably about 69% to about 73% of the exothermic heat of reaction is produced in the first stage. The first stage requires a large portion of the heat of reaction to heat and melt the solid alkali metal fluotitanate introduced into the first stage.

For the adiabatic mode, about 40 to about 60%, by weight, of the aluminum is oxidized to aluminum fluoride salts in the second stage C, preferably about 45% to about 55%, by weight, of the aluminum is oxidized to aluminum fluoride salts in the second stage. Sufficient solid alkali metal fluotitanate and molten titanium-aluminum-zinc alloy from second stage C are added to stage B to supply sufficient heat from the exothermic heat of reaction from the reduction of the +4 valent titanium to heat, and melt, the solid fluotitanate to the desired reaction temperature, e.g., about 900° C., and maintain the reactants and products in stage 3 at the desired reaction temperature. For each mole of +4 valent titanium added to first stage B, or optionally stages A and B, 1.333 moles of aluminum as the molten aluminum-zinc alloy are added to stage C, or optionally stages C and D. The exothermic heat of reaction from the reduction of the +3 valent titanium salt in stage C is sufficient to raise the temperature of the molten aluminum-zinc alloy to the desired reaction temperature and maintain the reactants in stage C at the desired reaction temperature.

To minimize heat losses, the reactors and piping in each stage are insulated with a conventional thermal insulation to minimize heat losses from conduction, convection and infra-red emissions.

In another aspect of this invention the alkali metal fluotitanate may be substituted by any titanate salt which is molten at the temperature conditions described above and comprises +4 valent titanium. Preferably, the chlortitanates are reduced with sodium or magnesium.

The instant invention further comprises an integral process for converting a titanium ore to titanium metal, by halogenating, e.g. fluorinating, a titanium oxide ore such as rutile, ilmenite, etc. to convert said titanium oxide to halides, e.g. fluorides, of titanium and then reducing said halides, e.g. fluorides, of titanium to titanium metal in the multi-step, adiabatic, countercurrent reduction process.

In a preferred embodiment of said integral process, ilmenite, which contains both iron and titanium in the oxide form, is fluorinated to convert said iron and titanium oxides to iron and titanium fluorides. The fluorination is preferably carried out by contacting the ore with a fluosilicate salt such as an alkali metal fluosilicate, for example, $K_2SiF_6$, $Na_2SiF_6$, etc. at a temperature from about 600° C. to 1000° C. preferably 750° C. to 950° C. The iron and titanium fluorides may be leached from the fluorinated ore by an aqueous solution. The aqueous solution may contain a strong acid (a mineral acid) to enhance the recovery of soluble titanium, i.e. alkali metal fluotitanate.

If the preferred alkali metal fluosilicate is utilized as the fluorinating agent for the ore, the corresponding fluotitante is the soluble titanium moiety. For example, when potassium fluosilicate is utilized as the fluorinating agent, a potassium fluotitanate salt will be dissolved in the leachate. The leachate will also contain various other soluble fluorides such as, for example, potassium fluoride. The leachate may be evaporated and cooled to precipitate out the alkali metal fluotitanate, for example, potassium fluotitanate.

The alkali metal fluotitanate precipitate may then be filtered and dried at a temperature of from about 110° C. to 150° C. and subsequently reduced to titanium metal. The method of reduction has been described above and comprises contacting the alkali metal fluotitanate salt with a molten zinc-aluminum alloy at a temperature of from about 650° C. to about 1000° C. in an inert atmosphere. The titanium present in the alkali metal fluotitanate salt will be converted into a titanium-zinc alloy by contacting with the aluminum-zinc alloy under such conditions and the aluminum will be converted into corresponding aluminum fluoride salts. The aluminum fluoride salts will dissolve in the molten salt phase and may form a salt similar to cryolite, i.e. a pseudocryolite such as mixtures of $Na_3AlF_6$, $Na_5Al_3F_{14}$ and $AlF_3$. The molten zinc-titanium alloy is separated from the molten salt mixture and passed through a distillation zone wherein the zinc is sublimed from the titanium under an inert atmosphere. The titanium may be recovered in the form of a titanium metal sponge.

DETAILED DESCRIPTION OF THE INTEGRAL PROCESS

Ilmenite which is an ore comprising titanium and iron oxides in admixture is available from various locations such as southern Georgia, northern Florida, and California. The ore will typically comprise from 25 to 50% by weight, titanium and 8 to 36% by weight, iron. A suitable ilmenite ore may be ground to a finely divided physical state to make it more susceptible to fluorination. For example, the ore may be ground to a particle size of from 30 to 400 mesh and preferably from 100 to 400, mesh. The ore may be fluorinated by fluorination agents known in the art such as $F_2$, $SiF_4$, $NH_4F$, $NH_4HF_2$, $ClF_3$, etc. However, in a most preferred embodiment of the instant invention, the fluorinating agent will be an alkali metal fluosilicate salt. This material is especially suitable because the more active fluorinating agents tend to attack the various equipment suitable for carrying out the fluorinating process.

Typical alkali metal fluosilicates include potassium and sodium salts. Sodium fluosilicates, for example, may be blended with the ore at a weight ratio of from 0.5 to 5.0 and preferably from 1.0 to 2.5 to effect adequate fluorination.

The fluorination will be carried out at conditions which are sufficient to convert both the titanium and the iron in the ore into the respective fluoride derivatives; that is, fluorides of titanium and iron, respectively. For example, if sodium fluosilicate is utilized as a fluorinating agent, the mixture of the fluosilicate and the ore will be heated to a temperature of at least 600° C. preferably from 750° to 950° C. for a time sufficient to change the iron and titanium from oxides to the fluorides. At higher temperatures, e.g. above 1000° C., the reactant mass may fuse and become difficult to remove from the reaction chamber; at lower temperatures, the reaction does not progress at a suitable rate.

It has been found that the presence of iron, especially ferrous iron, acts to enhance the fluorination reaction of the alkali metal fluosilicates noted above, and an increased recovery of soluble titanium is thus obtained. The ilmenite ores which are low in iron content may benefit from the addition of additional iron, for example, in the form of iron powder and/or iron oxide. Other titanium ores such as rutile and anatase, which are substantially iron-free, have been found to be benefited greatly by the addition of iron. Furthermore, it is found that the ilmenite ores having at least from 14 to 36% iron are very easily fluorinated by the above alkali metal fluosilicates and may not require additional iron powder and/or iron oxide.

It has been found that the addition of carbon in conjunction with either the iron present in the ilmenite ore or iron, e.g. oxide or iron powder, which is added to the lower iron-containing ilmenites, or rutile or anatase has a synergistic effect on the subsequent recovery of titanium. For example from 1 to 10, and preferably from 1.2 to 4 weight % carbon may be admixed with the titanium ore to enhance the recovery of titanium.

It has been found that when using the preferred alkali metal fluosilicates as fluorinating agents, the fluorination reaction is benefited by being carried out under an atmosphere of a gaseous fluorinating agent such as silicon tetrafluoride. It is believed that the silicon tetrafluoride may be an active fluorinating agent obtained from the alkali metal fluosilicate and thus acts to initiate and enhance the fluorination reaction of the ilmenite ore. Typically, the fluorination reaction may be carried out under an atmospheric pressure. However, the reaction may be conducted at partial pressures or elevated pressures from about 0.1 to about 70 psig.

The fluorinated ore may be cooled and then ground prior to the recovery of the soluble titanium by leaching the ground mixture of the fluorinated ore and the residue of the fluorinating agent by contacting under agitation with a leaching solution.

Leaching of the fluorinated ore may be carried out in an aqueous solution which may beneficially contain a strong acid such as hydrochloric, hydrofluoric or sulfuric acid. The pH of said leaching solution is preferably less than about 5.0, more preferably less than about 1, e.g., 0.1.

The leaching may take place at a temperature of a least 25° C., preferably from 60° C. to 95° C. The leach may be conducted at higher temperatures, e.g. 120° C. At elevated temperatures the leach is conducted in a pressure vessel. The leaching is carried out for a time sufficient to recover as much of the soluble fluorides of titanium as economically possible. Typically, leaching is carried out for about 0.1 to 3 hour with the ratio of leaching solution to the fluorinated ore varying from 15:1 to 5:1, e.g., 10:1 on a weight to weight basis. The leaching is very rapid and typically is conducted in a matter of minutes. The leachate is separated from a silica-rich residue of the fluorinated ore and the residue of the fluorinating agent by filtration.

The filtrate will comprise soluble fluorides of titanium, for example, in the preferred embodiment $K_2TiF_6$ or $Na_2TiF_6$. In addition, various soluble fluorides may be present in the filtrate, such as the fluoride salt of the corresponding alkali metal fluosilicate, such as sodium fluoride or potassium fluoride. It has been found that it is easy to separate the fluorides of titanium from such other soluble fluorides since solubility characteristics are such that the fluorides of titanium precipitate as the temperature of the solution is lowered while other impurities are more or less soluble in lower temperature solutions comprising dissolved titanium fluorides. Thus, the solution may be evaporated to concentrate soluble fluorides and then the temperature decreased until the fluorides of titanium crystallize. The crystals of the fluorides of titanium may be separated and dried at a temperature of from 50° to 150° C. to remove excess water.

The dried crystals of the fluorides of titanium may be reduced as described above to provide a molten titanium-zinc alloy.

The molten titanium-zinc alloy will be passed to a distillation zone wherein the zinc may be sublimed off off, under an inert atmosphere, at a temperature of from about 800° C. to 1000° C. to leave behind a titanium sponge. Alternatively, the zinc may be sublimed from the zinc-titanium alloy under a vacuum and at somewhat lower temperatures.

The titanium sponge may be sintered to reduce its surface area. After sintering and cooling, the sponge is passified by exposure to dilute $O_2$ to give a thin (monomolecular) protective coating of titanium oxide thereon before the sponge is exposed to a non-inert atmosphere. The zinc will be recovered and recycled for use in subsequent reducing steps.

The following is a preferred embodiment of the integral process.

Figure 2:
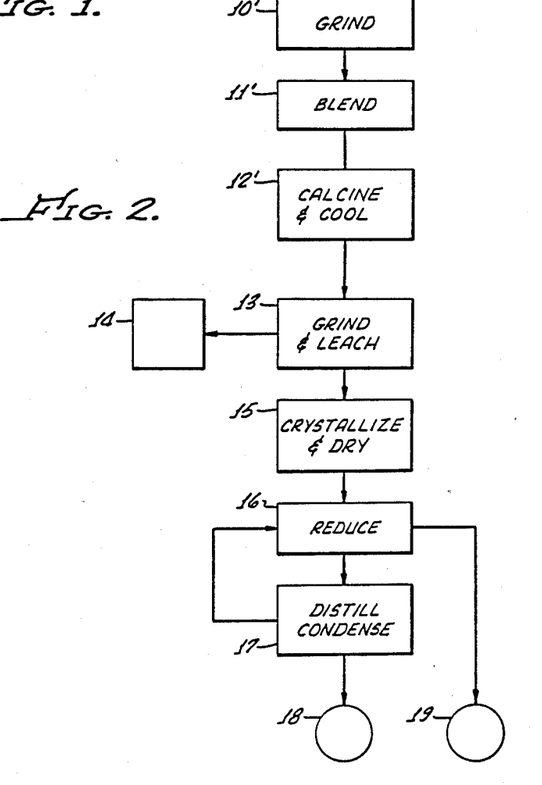
FIG. 2 is a schematic drawing illustrating a process for preparing titanium metal from titanium oxide ore according to the present invention.

38,000 lbs. of ilmenite having a composition of 31.6% titanium and 35% iron is mixed with 380 lbs. of carbon and the resulting mixture ground to a particle size of 100 mesh in grinding zone 10'. The ground ilmenite is then blended with 70,735 lbs. of sodium fluosilicate in blending zone 11'. The blended mixture is passed into calcining zone 12' wherein it is heated to a temperature of from 750° to 850° C., in the presence of one atmosphere of $SiF_4$, for a time of about 1 hour whereby the titanium oxides present in the ilmenite are converted to fluorides of titanium and the silicon fluorides present in the fluosilicate are converted to silicon dioxide. Similarly, some of the iron present in the ilmenite is converted to ferric fluoride. The fluorinated mixture is then ground in grinding zone 13 and leached with an aqueous hydrochloric acid solution containing 10% by weight hydrochloric acid at a ratio of 10 lbs. of solution/lb. fluorinated ore. A leachate is separated from the silica-containing residue from fluorination of the ilmenite.

The silica-containing residue are removed from said grinding and leaching zone and may be dried and recovered as a mixture of silicon dioxide and ferric oxide in zone 14. The leachate, after separation of the silica-containing residue, is passed to a crystallizing and drying zone 15 wherein about 740,000 lbs. of water is removed by heat and/or vacuum and the dewatered solution is cooled to a temperature of about 4° C. to crystallize sodium fluotitanate.

The crystallized sodium fluotitanate is reduced by contacting with an aluminum-zinc alloy comprising 11.71%, by weight, aluminum in reducing zone 16. The operations occurring in reducing zone 16 may be understood by reference to FIG. 1 and Table 1 wherein stages A through D represent reducing zone 16 and Table 1 gives the mass and heat balance for each stream of the above described multi-stage, continuous, countercurrent reduction process. Table 2 demonstrates that the instant multi-stage, countercurrent reduction process may operate nearly adiabatically. This table is generated by summing the heat of reaction in each stage as well as the heat provided by the various streams entering such stage and subtracting the heat removed by the streams exiting each stage.

The crystallized sodium fluotitanate is divided and introduced into reducing zone 16 as feed streams 7 and 8 at the first stage B and the metal cleanup reactor A. Note again that no heat other than the heat necessary to heat molten alloy phases 1 and 2 to about 450° C. is necessary to the process. The titanium-zinc alloy is removed from reducing zone 16 and passed into distillation zone 17 wherein zinc is distilled off at a temperature of at least 800° C. and at a vacuum of about $10^{-5}$ torr. The distilled zinc is recycled back to reduction zone 16 for subsequent reuse. Titanium metal is recovered from distillation zone 17 as a sponge 18. The molten salt mixture which is a mixture of sodium and aluminum fluoride, i.e. a pseudo cryolite, is recovered from reduction zone 16 and sent to recovery zone 19.

TABLE 1

| STREAM NUMBER | 1 | 2 | 3 | 4 | 5 | 6 | 7 | 8 | 9 | 10 | 11 | 12 |
|---|---|---|---|---|---|---|---|---|---|---|---|---|
| FLOW (LBS/HR) | 8359.04 | 568.08 | 578.29 | 9275.68 | 9272.21 | 9271.83 | 5865.59 | 170.00 | 170.38 | 6039.00 | 5701.09 | 5690.88 |
| PHYSICAL STATE | Liquid | Liquid | Liquid | Liquid | Liquid | Liquid | Solid | Solid | Liquid | Liquid | Liquid | Liquid |
| COMPOSITION (LBS) | | | | | | | | | | | | |
| Zn | 7379.87 | 501.54 | 501.54 | 7881.41 | 7881.41 | 7881.41 | — | — | — | — | — | — |
| Ti | — | — | 23.40 | 800.00 | 1374.00 | 1390.00 | 1351.43 | 39.17 | 23.17 | 801.00 | 24.0 | 0.60 |
| Al | 979.17 | 66.54 | 53.35 | 594.27 | 16.80 | 0.42 | — | — | 16.38 | 594.00 | 1032.10 | 1045.29 |
| Na | — | — | — | — | — | — | 1298.06 | 37.62 | 37.62 | 1335.68 | 1335.68 | 1335.68 |
| F | — | — | — | — | — | — | 3216.10 | 93.21 | 93.21 | 3309.31 | 3309.31 | 3309.31 |
| TEMP. °C. | 450° C. | 450° C. | 900° C. | 900° C. | 900° C. | 900° C. | 25° C. | 25° C. | 900° C. | 900° C. | 900° C. | 900° C. |
| HEAT, M BTU/HR | 1274.00 | 87.00 | 150.00 | 2405.68 | 2322.00 | 2319.00 | 0 | 0 | 97.00 | 3492.00 | 3460.00 | 3460.00 |

TABLE 2

| STAGE | A | B | C | D |
|---|---|---|---|---|
| HEAT IN, M BTU/HR | −2322 | −2503 | −4916 | −3547 |
| HEAT OUT, M BTU/HR | +2417 | +5814 | +5866 | +3610 |
| HEAT OF REACTION | −117 | −4058 | −1548 | −40 |
| NET HEAT FROM REACTOR, M BTU/HR | −22 | −747 | −599 | +23 |

Figure 1:
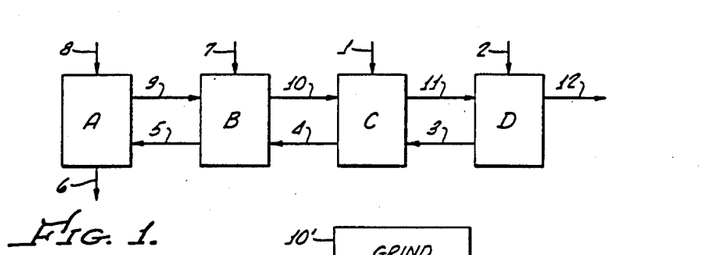
FIG. 1 is a schematic drawing illustrating a process of the present invention.

The following tables 3 and 4 show the mass and heat balances of a 2-stage continuous process of the present invention which makes reference to the flow diagram of FIG. 1:

In stage B, 78.8% of the +4 valent titanium is reduced to zero valent titanium and 21.1% of the +4 valent titanium is reduced to +3 valent titanium (Na$_5$Ti$_3$F$_{14}$). The product alloy contains 0.975 pound of titanium and 0.001 lbs of aluminum. The salt product from stage C contains 0.025 pounds of titanium. Thus, in this process scheme, 97.5% of the titanium is recovered. The heat balances for each stage show that sufficient heat is produced within the process to drive the process without the need for external heating, excluding the heat used to heat, and melt, the aluminum-zinc alloy to 450° C. (stream 1).

TABLE 3

| STREAM NUMBER | 1 | 4 | 5 | 7 | 10 | 11 |
|---|---|---|---|---|---|---|
| FLOW (LBS HR) | 6.405 | 6.711 | 6.643 | 4.340 | 4.408 | 4.102 |
| PHYSICAL STATE | Melt | Melt | Melt | Solid | Melt | Melt |
| TEMPERATURE | 450° C. | 900° C. | 900° C. | Ambient | 900° C. | 900° C. |
| COMPOSITION (LBS) | | | | | | |
| Zn | 5.667 | 5.667 | 5.667 | — | — | — |
| Ti | — | 0.700 | .975 | 1.000 | 0.725 | .025 |
| Al | 0.738 | 0.344 | 0.001 | — | 0.343 | 0.737 |
| Na | — | — | — | 0.960 | 0.960 | 0.960 |
| F | — | — | — | 2.380 | 2.380 | 2.380 |
| HEAT, M BTU/HR | 976 | 1740 | 1661 | 0 | 2411 | 2559 |

TABLE 4

| STAGE | B | C |
|---|---|---|
| HEAT IN, BTU | −1740 | −3387 |
| HEAT OUT, BTU | +4072 | +4299 |
| HEAT OF REACTION | −2745 | −1208 |
| NET HEAT FROM REACTOR, | −143 | −296 |

In stage B, 2680 BTU's are required to heat and melt the sodium fluotitanate salt leaving a balance of about −400 BTU's in stage B. In stage C, about 750 BTU's are required to heat the molten aluminum-zinc alloy introduced via stream 1 from 450° C. to 900° C. leaving a heat balance of about −300 BTU's in stage C.

What is claimed is:

1. A process for the step-wise reduction of a +4 valent titanium alkali metal fluotitanate to zero valent titanium comprising the steps of:
   (a) contacting in a first stage a crystalline +4 valent titanium alkali metal fluotitanate salt with a first molten alloy having a temperature between about 850° C. and about 950° C. and comprising titanium, aluminum and zinc to heat and melt said salt, reduce from about 27% to about 40% of the +4 valent titanium salt to zero valent titanium and reduce the balance of the +4 valent salt to +3 valent titanium salt, and to concurrently oxidize the aluminum in said alloy, the +3 titanium salt reporting to a first molten salt, the zero valent titanium reporting to the first molten alloy to form a second molten alloy comprising zero valent titanium and zinc and substantially depleted in aluminum, the heat of said first molten alloy and the exothermic heat from the reduction of said the valent titanium salt heating said crystalline salt to a temperature between about 850° C. and 950° C. and supplying substantially all the heat to the first stage, the temperature of said first molten salt and said second molten alloy being between about 850° C. and about 950° C.;

(b) separating said first molten salt from said second molten alloy;

(c) introducing a third molten alloy comprising principally zinc and between about 5% and 17% by weight aluminum heated to a temperature of between about 425° C. and 450° C. into a second stage wherein about 1.33 moles of aluminum are introduced into the process in the form of the third molten alloy for each mole of titanium introduced into the process as the crystalline +4 valent titanium salt;

(d) contacting in said second stage said first molten salt with said third molten alloy to reduce said +3 valent titanium salt in said first molten salt to zero valent titanium and to concurrently oxidize between about 40 and about 60% by weight of said aluminum in said third molten alloy to produce alkali metal aluminum fluoride and alkali metal fluoride salts, the zero valent titanium reporting to the third molten alloy to form said first molten alloy comprising titanium, aluminum and zinc, the alkali metal and aluminum salts reporting to the first molten salt to form a second molten salt substantially depleted of titanium salt, the heat of said first molten salt and the exothermic heat from the reduction of said +3 valent titanium salt heating said third molten alloy to a temperature between about 850° C. and 950° C., and supplying substantially all of the heat to the second stage, the temperature of said second molten salt and said first molten alloy being between about 850° C. and about 950° C.;

(e) separating said first molten alloy from said second molten salt.

2. A process for the step-wise reduction of a +4 valent titanium alkali metal fluotitanate to zero valent titanium substantially free of aluminum and the step-wise oxidation of aluminum to aluminum salts substantially free of titanium comprising the steps of:

(a) contacting in a first stage a crystalline +4 valent titanium alkali metal fluotitanate salt with a first molten alloy having a temperature between about 850° C. and about 950° C. and comprising titanium, aluminum and zinc to heat and melt said salt, reduce from about 69% to about 73% of the +4 valent titanium salt to zero valent titanium and reduce the balance of the +4 valent salt to +3 valent titanium salt, and to concurrently oxidize the aluminum in said alloy to produce alkali metal aluminum fluoride and alkali metal fluoride salts, the alkali metal, aluminum and the +3 titanium salts reporting to a first molten salt, the zero valent titanium reporting to the first molten alloy to form a second molten alloy comprising zero valent titanium and zinc and substantially depleted in aluminum, the heat of said first molten alloy and the exothermic heat from the reduction of said +4 valent titanium salt heating said crystalline salt to a temperature between about 850° C. and 950° C. and supplying substantially all the heat to the first stage, the temperature of said first molten salt and said second molten alloy being between about 850° C. and about 950° C.;

(b) separating said first molten salt from said second molten alloy;

(c) introducing a third molten alloy comprising principally zinc and between about 10% and about 12% aluminum and heated to a temperature between about 425° and about 450° C. into a second stage, wherein about 1.33 moles of aluminum are introduced into the process in the form of the third molten alloy for each mole of titanium introduced into the process as the +4 valent titanium metal fluotitanate;

(d) contacting in said second stage said first molten salt with said third molten alloy to reduce said +3 valent titanium salt in said first molten salt to zero valent titanium and to concurrently oxidize between about 45% and about 55% by weight of said aluminum in said third molten alloy to produce alkali metal aluminum fluoride and alkali metal fluoride salts, the zero valent titanium reporting to the third molten alloy to form said first molten alloy comprising titanium, aluminum and zinc, the alkali metal and aluminum salts reporting to the first molten salt to form a second molten salt substantially depleted of titanium salt, the heat of said first molten salt and the exothermic heat from the reduction of said +3 valent titanium salt heating said third molten alloy to a temperature between about 850° C. and 950° C., and supplying substantially all of the heat to the second stage, the temperature of said second molten salt and said first molten alloy being between about 850° C. and about 950° C.;

(e) separating said first molten alloy from said second molten salt.

3. A process for the step-wise reduction of a +4 valent titanium alkali metal fluotitanate to zero valent titanium comprising the steps of:

(a) contacting in a first stage a crystalline +4 valent titanium alkali metal fluotitanate salt with a first molten alloy having a temperature between about 850° C. and about 950° C. and comprising titanium, aluminum and zinc to heat and melt said salt, reduce from about 20% to about 70% of the +4 valent titanium salt to zero valent titanium and reduce the balance of the +4 valent salt to +3 valent titanium salt, and to concurrently oxidize the aluminum in said alloy, the +3 titanium salt reporting to a first molten salt, the zero valent titanium reporting to the first molten alloy to form a second molten alloy comprising zero valent titanium and zinc and substantially depleted in aluminum, the heat of said first molten alloy and the exothermic heat from the reduction of said the valent titanium salt heating said crystalline salt to a temperature between about 850° C. and 950° C. and supplying substantially all the heat to the first stage, the temperature of said first molten salt and said second molten alloy being between about 850° C. and about 950° C.;

(b) separating said first molten salt from said second molten alloy;

(c) introducing a third molten alloy comprising principally aluminum and zinc into a second stage wherein about 1.33 moles of aluminum are introduced into the process as the third molten alloy for each mole of titanium introduced into the process as the crystalline +4 valent titanium salt;

(d) contacting in said second stage said first molten salt with said third molten alloy to reduce said +3 valent titanium salt in said first molten salt to zero valent titanium and to concurrently oxidize a portion of said aluminum in said third molten alloy to produce alkali metal aluminum fluoride and alkali metal fluoride salts, the zero valent titanium reporting to the third molten alloy to form said first molten alloy comprising titanium, aluminum and zinc, the alkali metal and aluminum salts reporting to the first molten salt to form a second molten salt substantially depleted of titanium salt, the heat of said first molten salt and the exothermic heat from the reduction of said +3 valent titanium salt heating said third molten alloy to a temperature between about 850° C. and 950° C., and supplying substantially all of the heat to the second stage, the temperature of said second molten salt and said first molten alloy being between about 850° C. and about 950° C.;

(e) separating said first molten alloy from said second molten salt.

4. The process according to claim 3 wherein the temperature in said first stage is maintained by adjusting the amount of crystalline +4 valent titanium alkali metal fluotitanate salt added to the first stage.

5. The process according to claim 3 wherein the temperature within the first stage is maintained by adjusting the amount of first molten alloy introduced into said first stage.

6. The process according to claim 3 wherein the temperature within the second stage is maintained by adjusting the amount of first molten salt introduced to said second stage.

7. The process according to claim 3 wherein the temperature within said second stage is maintained by adjusting the amount of third molten alloy introduced to said second stage.

8. The process according to claim 3 wherein the temperature within said second stage is maintained by adjusting the temperature of the third molten alloy introduced to said second stage.

9. The process according to claim 3 wherein substantially all the aluminum in said first molten alloy phase in said first stage is oxidized to produce alkali metal aluminum fluoride and alkali metal fluoride salts which report to said first molten salt phase.

10. The process according to claim 3 wherein the third molten alloy is heated to a temperature of between about 425° C. and about 450° C. when introduced into said second stage.

11. The process according to claim 3 wherein the +4 valent titanium alkali metal fluotitanate is sodium fluotitanate.

12. The process according to claim 3 wherein the first molten salt and the first molten alloy are heated to a temperature of about 900° C.

13. The process according to claim 12 wherein between about 27% to about 40% by weight of the +4 valent titanium alkali metal fluotitanate salt is reduced to zero valent titanium in said first stage.

14. The process according to claim 12 wherein about 66 to about 76% of the total process exothermic heat of reduction from the reduction of the +4 valent titanium alkali metal fluotitanate salt to zero valent titanium is produced in the first stage.

15. The process according to claim 12 wherein about 69% to about 73% of the total process exothermic heat of reduction from the reduction of the +4 valent titanium alkali metal fluotitanate salt to zero valent titanium is produced in the first stage.

16. The process according to claim 3 wherein between about 40% and about 60% by weight of the aluminum in the third molten alloy is oxidized in the second stage.

17. The process according to claim 3 wherein between about 45% to about 55% by weight of the aluminum in the third molten alloy is oxidized in said second stage.

18. The process according to claim 3 wherein the third molten alloy is introduced into said second stage comprises between about 5% and about 17% by weight aluminum.

19. The process according to claim 3 wherein the third molten alloy introduced into said second stage comprises between about 10% and about 12% by weight aluminum.

20. The process according to claim 3 wherein the second molten alloy comprises about 14% by weight titanium.

21. The process according to claim 20 wherein the second molten alloy comprises less than 0.2% by weight aluminum.

22. The process according to claim 3 wheren the second molten salt comprises less than 0.5% by weight titanium.

23. The process according to claim 2 further comprising introducing said second molten alloy into a metal clean-up stage and therein contacting said second molten alloy with a crystalline +4 valent titanium alkali metal fluotitanate salt to melt said crystalline salt and to oxidize substantially all of the aluminum in said second molten alloy phase and concurrently reduce a portion of the +4 valent titanium salt to +3 valent titanium and zero valent titanium to provide:

(i) a third molten salt comprising alkali metal fluoride, alkali metal aluminum fluoride salt and +3 valent titanium salts, and (ii) a fourth molten alloy comprising titanium and zinc, and less than about 0.005% by weight aluminum.

24. The process according to claim 23 comprising separating said third molten salt from said fourth molten alloy and passing said salt to said first stage and recovering said fourth molten alloy phase.

25. The process according to claim 3 further comprising introducing said second molten salt into a salt clean-up stage and therein contacting said second molten salt with a fifth molten alloy comprising aluminum and zinc to reduce substantially all of the titanium in said second molten salt to zero valent titanium and concurrently oxidizing a portion of the aluminum in said fifth molten alloy to an alkali metal aluminum fluoride and alkali metal fluoride salts to provide:

(i) a fourth molten salt comprising alkali metal aluminum fluoride and alkali metal fluoride salts and less than about 0.01% titanium, and (ii) a sixth molten alloy comprising aluminum, zinc and titanium.

26. The process according to claim 25 further comprising separating said sixth molten alloy phase from said fourth molten salt and passing said alloy to said second stage and recovering said fourth molten salt phase.

27. A process for the step-wise reduction of a +4 valent titanium alkali metal fluotitanate to zero valent titanium substantially free of aluminum and the step-wise oxidation of aluminum to aluminum salts substantially free of titanium comprising the steps of:
- (a) contacting in a first stage a crystalline +4 valent titanium alkali metal fluotitanate salt with a first molten alloy having a temperature between about 850° C., and about 950° C. and comprising titanium, aluminum and zinc to heat and melt said salt, reduce from about 20% to about 70% of the +4 valent titanium salt to zero valent titanium and reduce the balance of the +4 valent salt to +3 valent titanium salt, and to concurrently oxidize the aluminum in said alloy to produce alkali metal aluminum fluoride and alkali metal fluoride salts, the alkali metal, aluminum and the +3 titanium salts reporting to a first molten salt, the zero valent titanium reporting to the first molten alloy to form a second molten alloy comprising zero valent titanium and zinc and substantially depleted in aluminum, the heat of said first molten alloy and the exothermic heat from the reduction of said +4 valent titanium salt heating said crystalline salt to a temperature between about 850° C. and 950° C. and supplying substantially all the heat to the first stage, the temperature of said first molten salt and said second molten alloy being between about 850° C. and about 950° C.;
- (b) separating said first molten salt from said second molten alloy;
- (c) introducing a third molten alloy comprising principally aluminum and zinc into a second stage, wherein about 1.33 moles of aluminum are introduced into the process in the form of the third molten alloy for each mole of titanium introduced into the process as the +4 valent titanium metal fluotitanate;
- (d) contacting in said second stage said first molten salt with said third molten alloy to reduce said +3 valent titanium salt in said first molten salt to zero valent titanium and to concurrently oxidize a portion of said aluminum in said third molten alloy to produce alkali metal aluminum fluoride and alkali metal fluoride salts, the zero valent titanium reporting to the third molten alloy to form said first molten alloy comprising titanium, aluminum and zinc, the alkali metal and aluminum salts reporting to the first molten salt to form a second molten salt substantially depleted of titanium salt, the heat of said first molten salt and the exothermic heat from the reduction of said +3 valent titanium salt heating said third molten alloy to a temperature between about 850° C. and 950° C., and supplying substantially all of the heat to the second stage, the temperature of said second molten salt and said first molten alloy being between about 850° C. and about 950° C.;
- (e) separating said first molten alloy from said second molten salt.

28. The process according to claim 27 wherein the temperature within the first stage is maintained by adjusting the amount of first molten alloy introduced into said first stage.

29. The process according to claim 27 wherein the temperature within the second stage is maintained by adjusting the amount of first molten salt introduced into said second stage.

30. The process according to claim 27 wherein the temperature within said second stage is maintained by adjusting the temperature of the third molten alloy introduced into said second stage.

31. The process according to claim 27 wherein the third molten alloy is heated to a temperature of between about 425° C. and about 450° C. when introduced into said second stage.

32. The process according to claim 27 wherein about 27% to about 40% by weight of the +4 valent titanium alkali metal fluotitanate salt is reduced to zero valent titanium in said first stage.

33. The process according to claim 27 wherein about 69% to about 73% of the total process exothermic heat of reduction from the reduction of the +4 valent titanium alkali metal fluotitanate salt to zero valent titanium is produced in the first stage.

34. The process according to claim 27 wherein between about 45% and about 55% by weight of the aluminum in the third molten alloy is oxidized in said second stage.

35. The process according to claim 27 wherein the third molten alloy introduced into said second stage comprises between about 10% and about 12% by weight aluminum.

36. The process according to claim 27 wherein the second malten alloy comprises about 14% by weight titanium.

* * * * *